United States Patent [19]
Fellwock et al.

[11] 3,813,137
[45] May 28, 1974

[54] REFRIGERATOR CABINET

[75] Inventors: Charles G. Fellwock; Kenneth L. Hortin; Harry L. Tillman, all of Evansville, Ind.

[73] Assignee: Whirlpool Corporation, Benton Harbor, Mich.

[22] Filed: Dec. 27, 1972

[21] Appl. No.: 318,865

[52] U.S. Cl. ................. 312/214, 220/9 F, 220/9 G
[51] Int. Cl. ........................................... A47b 81/00
[58] Field of Search .............. 312/214; 220/9 F, 9 G

[56] References Cited
UNITED STATES PATENTS
3,294,462   12/1966   Kesling .............................. 312/214
3,719,303   3/1973   Kronenberger ...................... 220/9 F Primary Examiner—James C. Mitchell
Attorney, Agent, or Firm—Hofgren, Wegner, Allen, Stellman & McCord

[57] ABSTRACT

A refrigerator cabinet construction having an outer sheet metal shell for strength and rigidity, a thin relatively fragile liner body spaced therefrom to provide an insulation space and an adherent solid foam filling the space and adhered to the outer shell and, at spaced areas, to the liner body. The cabinet including the liner body is subject to extremes of thermal stress at localized areas which tend to rupture the fragile liner body but with these areas each having a layer of a parting agent such as a sheet of polymeric material between the liner body and the foam so that the foam does not adhere to the liner body and adheres only sparingly or not at all to the layers of parting agent with the result that extremes of stress at these localized areas are not applied to the liner body but to the yieldable layers of parting agent. The parting agent allows the foam insulation and the liner body to free themselves from each other if necessary because of expansion or contraction and to shrink or move independently, rather than be held tightly with a possible stress crack failure of the liner body.

9 Claims, 6 Drawing Figures

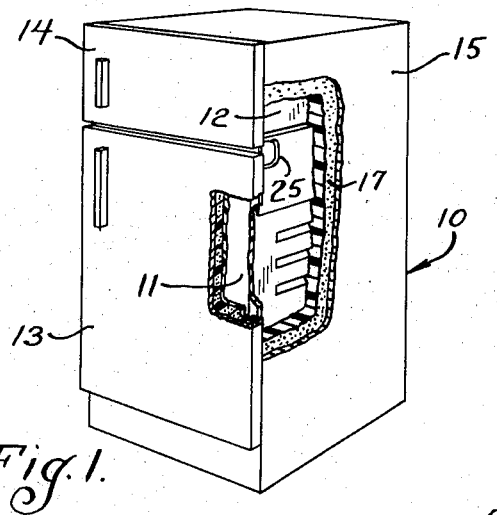
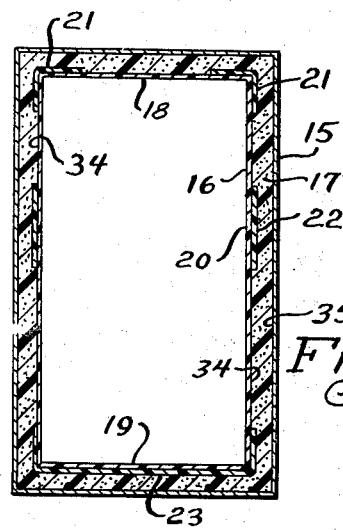
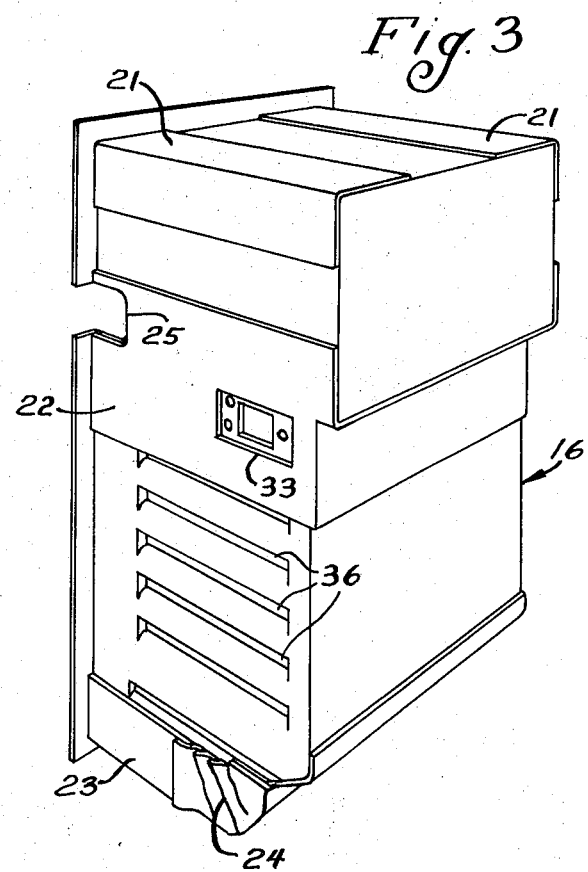
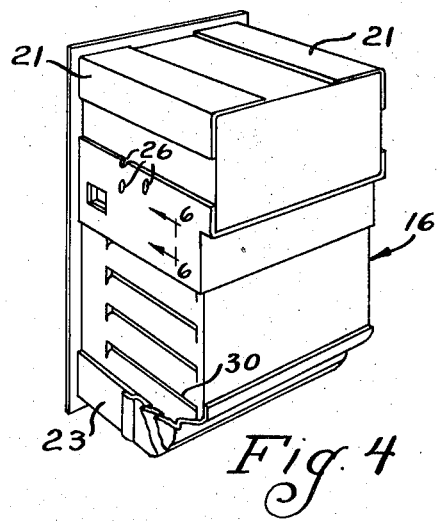
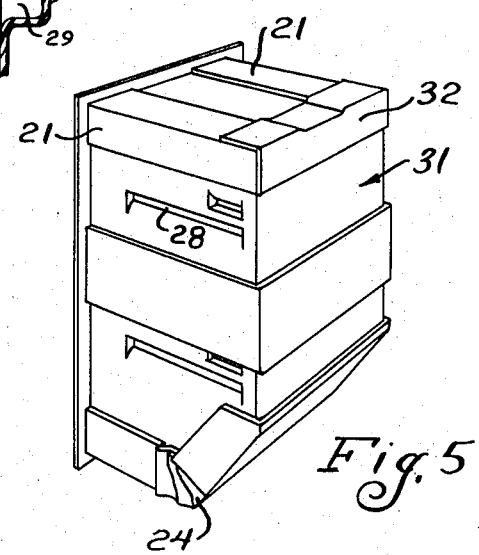

3,813,137

REFRIGERATOR CABINET

BACKGROUND OF THE INVENTION

In recent years the art of refrigerator insulation has become quite advanced with the best insulating material being cast resin foam that is solid and adherent with an excellent example of such a foam being a rigid polyurethane foam. This permits the insulation to be quite thin relative to its insulating value so that refrigerators and refrigerating equipment, which as used herein is intended to include refrigerators, freezers and refrigerator-freezer combinations, are now being made of relatively small overall cabinet size compared to the amount of storage space within them.

Such adhered rigid foam insulation which normally joins to the contacted surfaces of the usual outer sheet metal shell and the thin relatively fragile liner body forming the inside of the unit has the disadvantage that when the cabinet is subjected to extreme temperature changes the thermal forces of expansion and contraction are transmitted to the fragile liner body causing it to break or otherwise be damaged in those areas where the thermal stress is extreme. These areas are normally at the top and bottom of the linear and the adjacent areas of the freezer section and the refrigerator section of the cabinet where the refrigerator unit includes both refrigerator chilling and freezing.

One of the features of this invention therefore is to provide an improved refrigerator cabinet in which the relatively fragile liner body is protected against extreme stress at the localized areas where these extreme stress forces occur, but with the linear body being otherwise attached to the liner for strength.

DESCRIPTION OF THE PRIOR ART

The most pertinent prior art publication of which applicants are aware in Kesling patent 3,294,462. In this patent there is the provision of a parting agent at spaced areas of the liner body but there is no attempt to locate these areas at the places where extreme thermal stresses occur.

BRIEF DESCRIPTION OF THE DRAWINGS

FIG. 1 is a perspective view partially broken away for clarity of illustration of a refrigerator cabinet embodying the invention.

FIG. 2 is a vertical transverse sectional view through the cabinet of FIG. 1 with the dimensions of the parts being shown somewhat exaggerated for illustrative purposes.

FIG. 3 is a perspective view of the liner body only of the cabinet of FIGS. 1 and 2.

FIG. 4 is a view similar to FIG. 3 but showing a second embodiment of the liner body.

FIG. 5 is similar to FIG. 4 but showing still another embodiment.

FIG. 6 is an enlarged detail sectional view taken substantially along line 6—6 of FIG. 4.

DESCRIPTION OF THE PREFERRED EMBODIMENTS

In the embodiment of FIGS. 1-3 the refrigerator cabinet 10 comprises a lower refrigerating section 11 which is customarily maintained at above freezing temperatures and an upper freezer section 12 which is customarily maintained at a below freezing temperature each providing with its separate door 13 and 14, respectively, in the customary manner.

The compartment 10 has a strong outer sheet metal shell 15 which is customarily steel and an inner relatively fragile liner body 16 spaced inwardly thereof to provide a space which is customarily filled with a rigid cast resin foam 17 that is adherent and normally strongly bonded to the confronting surfaces of both the shell 15 and the liner body 16.

Such a foam that is widely used in this type of construction is rigid polyurethane foam. It has excellent insulation properties, is strongly adherent to the customary surfaces with which it comes in contact and is resilient to breakage.

The inner liner body 16 is preferably a plastic resin and is thin and relatively fragile. Suitable plastic resins that are widely used include acrylonitrile butadiene styrene copolymer, modified polystyrene, polyolefins such as polyethylene and polypropylene, vinyl chloride polymers and the like. The insulation foam 17 is customarily foamed-in-place within the space formed by the confronting surfaces of the shell 15 and the liner 16 to fill this space as shown in FIG. 2.

Refrigerator cabinets of the type illustrated at 10 are subjected to extremes of temperature changes in local areas which set up stress that tends to fracture or at least buckle the liner body 16. Further, during shipping and distribution of refrigerators, extreme temperature conditions may be encountered, which, due to differences in the coefficients of expansion of the liner body material and cabinet shell material set up stress that tends to stress crack or damage the liner body 16. This is particularly true at the top 18 and bottom 19 of the liner 16 and especially at the corners. Another area of extremes of thermal stress caused by contraction and expansion thermal changes is at 20 where the liner body overlaps the adjacent areas of the refrigerating section 11 and the freezer section 12.

In order to prevent these extremes of thermal stresses from damaging the liner body 16 these areas are provided with a parting or release agent means in the form of a layer or sheet of material between the liner body and the foam with the foam adhering either not at all or very lightly to the layers or sheets at these areas of concentrated stress. Thus as illustrated in the first embodiment the top corners of the liner body 16 are provided with a layer or sheet 21 of parting agent. Similarly, the area 20 where the freezer section and refrigerating section are adjacent each other is provided with a layer or sheet of parting agent 22. The bottom 19 of the liner is similarly provided with its layer or sheet 23 of parting agent. Each of these layers 21, 22 and 23 is between the liner and the insulating foam 17 so that the foam is joined either lightly or not at all to the parting agent and the parting agent is joined to the liner 16.

The result is that the parting agents do not reduce the overall strength of the cabinet which is obtained in large part by the rigidity of the foam 17 and the strength of its bonding to the surfaces with which it comes in contact as illustrated by the surfaces 34 and 35. However, at these areas of extreme thermal stresses which as stated are customarily at the top and bottom of the cabinet and where the unit is a refrigerator-freezer at the areas where these sections are adjacent each other are protected from damage by the layers of parting agent.

In the first embodiment of FIGS. 1–3 the bottom parting sheet 23 is curved at the rear by overlapping 24 to enclose the compressor sump area. This same construction is used in the embodiments of FIGS. 4 and 5.

In all embodiments the sheet is cut away or otherwise removed at areas as indicated at 33, 25 and 26 to expose plug openings, splice boxes, screw anchors and the like. Also, as is illustrated in FIG. 6, the sheet 27 of separating agent can bridge across the concave sides of protuberances 28 such as the illustrated separator mounting track. On the other hand, if desired, the sheet 27 may be slit and recessed into the interior 29 of these protuberances so that the foam 17 can fill them.

With the structure of this invention the layers or sheets of parting agent provide stress relief where needed at the areas of extreme thermal stresses but provide the rigidity where it is needed at shelf supports 36, separator supports 28 and chiller supports 30 in similar areas where maximum strength is required.

In the embodiment of FIG. 5 the liner body 31 is not only provided at the top with the side edge parting sheets 21 but also with the rear edge enclosing parting sheet 32.

The parting agent or sheet may be any sheet material to which the insulation foam and particularly polyurethane is non-adherent or lightly adherent. Examples of these include polyolefins such as polyethylene or polypropylene, sprayed on or painted on polyvinyl alcohol solutions which upon drying deposit a sheet or layer, kraft paper and the like.

Having described the invention, the embodiments of the invention in which an exclusive property or privilege is claimed are defined as follows:

1. A refrigerator cabinet subject to temperature extremes causing thermal stress at spaced localized areas, comprising: an outer metal shell; a thin, relatively fragile liner body spaced therefrom; adherent cast resin foam insulation adherent between said shell and liner; and spaced layers of a parting agent means between said foam and liner only at said spaced localized areas of temperature extremes for permitting relative movement between said liner and foam at said areas of temperature extremes on temperature variation caused contraction and expansion, said foam being thereby adhered to adjacent areas of said shell and liner body for providing a strong cabinet construction.

2. The cabinet of claim 1 wherein there are provided a freezer section and a refrigerator section in the cabinet and a layer of said parting agent at the liner area that is adjacent the two sections.

3. The cabinet of claim 2 wherein said freezer and refrigerator sections are adjacent each other and said parting layer agent at the sections includes portions overlapping the adjacent areas of the liner at said sections.

4. The cabinet of claim 1 wherein said cabinet comprises a substantially vertically rectangular liner body having top opposite corners and a bottom, said layers of parting agent means being located at said opposite corners and enclosing said bottom.

5. The cabinet of claim 4 wherein said cabinet comprises a top freezing section including said opposite corners, a bottom refrigerator section including said bottom and an intermediate section spanning the adjacent portions of the freezer and refrigerator and a said parting agent means layer being located at said intermediate section.

6. A refrigerator cabinet subject to temperature extremes causing thermal stress at spaced localized areas, comprising: an outer sheet metal shell; a thin, relatively fragile liner body spaced therefrom; adherent cast resin foam insulation adherent between said shell and liner; and spaced layers of a parting agent means between said foam and liner only at said spaced localized areas of temperature extremes for permitting relative movement between said liner and foam at said areas of temperature extremes on temperature variation caused contraction and expansion, said foam being thereby adhered to adjacent areas of said shell and liner body for providing a strong cabinet construction, said cabinet comprising a substantially vertically rectangular liner body having top opposite corners and a bottom, said layers of parting agent means being located at said opposite corners and enclosing said bottom, said cabinet comprising a top freezing section including said opposite corners, a bottom refrigerator section including said bottom and an intermediate section spanning the adjacent portions of the freezer and refrigerator and a said parting agent means layer located at said intermediate section.

7. The cabinet of claim 1 wherein said liner comprises areas containing plug openings, screw anchors and a splice box and said layer of parting agent means is secured to the liner surrounding said areas by having openings therein substantially coinciding with said areas.

8. The cabinet of claim 1 wherein said liner comprises protuberances extending away from said foam and a layer of parting agent means bridges said protuberance on the side thereof adjacent the foam.

9. The cabinet of claim 1 wherein said liner comprises areas containing plug openings, screw anchors and a splice box and said layer of parting agent means is secured to the liner surrounding said areas by having openings therein substantially coinciding with said areas and said liner comprises protuberances extending away from said boam and a layer of parting agent means bridges said protuberance on the side thereof adjacent the foam.

* * * * *